United States Patent

Cafarella

[11] Patent Number: 5,839,218
[45] Date of Patent: Nov. 24, 1998

[54] SIGNAL DEVICE AND METHOD FOR STILL FISHING

[76] Inventor: Alan C. Cafarella, 63 State Rd., Erving, Mass. 01344

[21] Appl. No.: 805,367

[22] Filed: Feb. 24, 1997

[51] Int. Cl.⁶ .................................................. A01K 97/12
[52] U.S. Cl. ................................................................ 43/17
[58] Field of Search ........................... 43/17, 43.12, 25.2

[56]  References Cited

U.S. PATENT DOCUMENTS

| | | | |
|---|---|---|---|
| 2,530,050 | 11/1950 | Evans | 43/17 |
| 2,601,839 | 7/1952 | Kucewicz | 43/17 |
| 2,641,079 | 6/1953 | Oster | 43/17 |
| 2,901,855 | 9/1959 | Todd | 43/17 |
| 2,931,122 | 4/1960 | Thordston et al. | 43/17 |
| 3,023,532 | 3/1962 | Gorenty | 43/43.12 |
| 3,143,822 | 8/1964 | Schooley | 43/17 |
| 3,187,456 | 6/1965 | Apitz | 43/17 |
| 3,529,375 | 9/1970 | Dey | 43/17 |
| 3,744,172 | 7/1973 | Kelli | 43/17 |
| 3,814,048 | 6/1974 | Bartholomew | 43/17 |
| 3,950,880 | 4/1976 | Polaszek | 43/17 |
| 4,125,957 | 11/1978 | Cunningham | 43/17 |
| 4,236,340 | 12/1980 | Cunningham | 43/17 |
| 4,300,304 | 11/1981 | Maycook et al. | 43/17 |
| 4,505,063 | 3/1985 | Price et al. | 43/17 |
| 4,552,318 | 11/1985 | Durham | 43/17 |
| 4,616,437 | 10/1986 | Harvey | 43/17 |
| 4,702,031 | 10/1987 | Sousa | 43/17 |
| 4,709,500 | 12/1987 | Yasumiishi | 43/17 |
| 4,766,688 | 8/1988 | Hiles | 43/17 |
| 4,939,864 | 7/1990 | Bowles | 43/17 |
| 5,010,678 | 4/1991 | Peck et al. | 43/17 |
| 5,287,646 | 2/1994 | Kuhlman | 43/17 |
| 5,351,432 | 10/1994 | Tse | 43/17 |
| 5,495,688 | 3/1996 | Sondej et al. | 43/17 |
| 5,515,639 | 5/1996 | Phipps | 43/17 |
| 5,586,402 | 12/1996 | Brent et al. | 43/17 |

FOREIGN PATENT DOCUMENTS

| | | | |
|---|---|---|---|
| 422913 | 4/1991 | European Pat. Off. | 43/17 |
| 3832151 | 4/1990 | Germany | 43/17 |
| 1286242 | 8/1972 | United Kingdom | 43/17 |
| 2021372 | 12/1979 | United Kingdom | 43/17 |
| 2093671 | 9/1982 | United Kingdom | 43/17 |

*Primary Examiner*—Michael J. Carone
*Assistant Examiner*—Darren Ark
*Attorney, Agent, or Firm*—Alden J. Gray

[57]  ABSTRACT

A fish bite indicator comprising a simple torus slipped over the end of a fishing pole and positioned by the tension in the cast out line whereby the change in tension caused by a biting fish changes the position of the torus.

4 Claims, 4 Drawing Sheets

SIGNAL DEVICE AND METHOD FOR STILL FISHING

The present invention involves fishing devices and more particularly a method of using a visible torus to provide a signal that indicates a fish has taken bait. Providing illumination for the torus makes it usable at night or under low light conditions such as occur at dawn and dusk.

BACKGROUND OF THE INVENTION

Still fishing along ponds and slow moving streams is popular for catching bottom feeders like catfish, horned pout, brown trout, and eels. Also still fishing in the ocean is popular for such species as stripped bass, blue fish, snook, salt water catfish, sea trout, and many other types of fish. Still fishing at night allows avid fishermen time for their sport outside the normal work day hours. A normal sequence of events for still fishing may comprise the steps of: acquiring tackle, locating and moving to a shore or stream bank in close proximity to where the desired fish are thought to be, casting out the bait, setting the fishing pole or poles (as in many cases more than one fishing pole is used) onto the ground or a stand with the line still cast into the water, and then waiting while closely watching for a movement in the fishing pole or line, or holding the line to feel the movement indicating a fish biting. If a bite occurring is sensed, the person fishing picks up the fishing pole, hooks the fish and reels the fish in.

The period of time waiting for a fish to bite on a bait may be short or take as long as hour or more, so holding the lines or the fishing poles can become be very tedious, and in the case of the use of multiple fishing poles, almost impossible as the lines would all tangle. Therefore, most people that still fish desire devices and methods that provide easily read bite signals.

Watching a single thin line constantly for long periods to detect a particular movement can bore even the most avid. People still fishing at night often sit down, doze, or walk around, not always being close to or constantly watching their fishing poles or lines or signal devices. During these times of inattention, a fish bite can go undetected especially in the dark or other low light conditions. For these and other reasons, a simple bite indicator that records a change caused by a fish's biting, as well as showing the instance of the biting, has long been sought.

The most popular prior art night fishing bite indicator is the illuminated float such as described in U.S. Pat. No. 5,351,432 dated Oct. 4th 1994 by Steven Tse. A major fault with the illuminated float as a night fishing bite indicator is that the float drifts with the wind and water currents. If the line length between the float and the hook is less than the water depth, the hook will travel with the float, and this drifting motion may move the bait to areas where the person fishing may not want to fish. The drifting of the float and hook can create an accumulation of slack line between the float and the hook allowing the fish to nibble the bait off the hook without sufficiently pulling the line to signal a bite. Also the wind and water currents can move the float into areas of shallower water, dragging the hook on the bottom, and snagging the hook on some obstruction on the bottom. If the hook is embedded in the obstruction, the line will have to be broken in order to free the pole. Line tension from wind and water currents can cause a false signal and the unnatural motion of the bait being dragged by these currents can scare the fish.

Not indicating a bite is also a problem with night fishing bite indicator devices that illuminate the tip of the fishing pole as described by Donald L. Price, et al. in U.S. Pat. No. 4,505,063 dated Mar. 19, 1985. If the fish moves the baited hook in toward the fishing pole, a slack line will be created. With a slack line, a fish's moving the hook cannot cause the tip of the fishing pole to move and will not provide an indication of a bite or an indication that a bite ever occurred. Another problem with the tip illuminated device is that the tension on the line and any slight vibration of the pole tip can be felt by a light biting fish, and it may be scared from biting before the person fishing can pick up the fishing pole and set the hook.

Other prior art signal devices are attached to the fishing pole as shown, for example, in U.S. Pat. No. 3,027,675 by Ray H. Parsons dated Sep. 24th, 1958. These are bulky and add weight and awkwardness to the fishing pole. With such devices, getting the proper line pull tension is difficult and unreliable. Too much line pull tension and the devise will not detect a bite; too little line tension and the devise will not hold the line in windy conditions and will give a false alarm. The small lights found on some of the fishing pole mounted devises can only be seen a short distance away and only with the pole laid in a proper position to afford a direct view of the light. If the fish swims toward the fishing pole with the bait in its mouth and creates a slack line, these devices will not trigger a signal of a bite.

A weight strung between eyes on the fishing pole, as by Sousa in U.S. Pat. No. 4,702,031, Oct. 27, 1987, adds an uncomfortable unbalance to the pole and cannot be adjusted for fishing conditions. If the weight is selected for conditions with no breeze or water current, the pole will be useless when a breeze comes up unless it is restrung with a heavier and more obnoxious weight.

Also known as prior art is a fish rod holder that is tilted by the pull of the fish. The tilt causes electrical contacts in a normally open switch to close and thus lights a signal lamp. This type of signal device does not indicate when slack line is created by the fish coming toward the fishing pole so that there is no pull on the fishing pole to trigger the alarm. Also a light biting fish can feel the unnatural tripping tension at the same time the alarm is set, thereby not giving the person fishing a chance to pick up the fishing pole and set the hook.

SUMMARY OF THE INVENTION

The present invention is a method for indicating the fact of a fish biting a baited hook including the steps of:

1. Acquiring fishing tackle comprising at least a fishing pole, reel, line, hook, bait, and a novel indicator torus as herein described.
2. Locating and moving said tackle to a stream bank or shore from which to fish.
3. Baiting said hook and casting the baited hook and line in a normal fashion using the unencumbered fishing pole.
4. Placing said pole in a convenient support to hold the rod at an angle to the horizontal with the reel locked or the bail closed after removing most of the slack line.
5. Placing said indicator torus over the end of the pole such that the torus is supported by the tension in the line.
6. Waiting for the torus to change position indicating that a fish has taken the bait and moved the hook.
7. Picking up the pole so as to shed the torus onto the ground, hooking the fish and reeling it in as is conventionally done.

This method is the usual and common procedure for still fishing without the use of an indicator and adds only the simple step of placing a selected torus advantageously over the tip end of the fishing pole to enable indicator assisted fishing. The prior art process for indicator assisted fishing includes several steps for modifying the reel or pole or attaching the signal device.

Said torus will indicate a fish pulling on the bait either toward said fishing pole or away from said fishing pole by increasing or decreasing the line tension which in turn, respectively, lets the torus slide down the fishing pole or pulls the torus up toward the tip of the fishing pole. By using a properly sized illuminated torus, the person fishing can go a distance from said fishing pole and still see said torus even with little ambient light. If said torus has not been seen moving, the fact that it has moved from its original position indicates a fish bite may have taken place. The present invention overcomes the faults of the known major types of night fishing indicators.

Advantages from use of a luminous torus for night fishing may be better realized by attaching a small piece of reflecting tape to the pole to help judge the relative position of the torus in very low light conditions. Also, tying a length if string between the torus and the pole handle or a ground stake reduces chances of losing the torus into brush or flowing water if a large fish hits the bait hard.

The present invention greatly assists bottom fishing because the torus attached directly from the line to the sinker with no float in between is not susceptible to wind and water current drift that can cause a slack line. As there is no float pull on the fishing line due to wind and water currents, the possibility of the hook being dragged along the bottom and snagging an obstruction is eliminated.

When the fish moves toward the fishing pole with the baited hook in its mouth, the torus of the present invention moves down the pole taking up slack line and indicates a fish biting. Also if the fish stops moving with the bait in any direction that shortens or lengthens the out line, the torus position will follow the movement and record the fact that a bite had occurred. None of the prior art types of fishing bite signal indicators would show this record. As the present invention puts only a slight natural drag on the line, a light biting fish will not feel and be scared by the unnatural vibration and drag of the fishing pole. The person fishing will have the time necessary to pick up the fishing pole and set the hook.

The torus is not attached to the fishing pole when casting out or when reeling in the line or reeling in the fish, thus there is no added weight or awkwardness when the fishing pole is being handled. When the pole is set in a stand waiting for action, proper line tension is maintained by the slight pull of the torus and can be adjusted easily for increased wind by increasing the angle of the fishing pole relative to horizontal. This will increase the force vector directed along the line outward from the fishing pole and thereby increase the standing tension in the line. When the whole torus is illuminated, a fish bite signal can be seen a good distance away in the dark. If the fish swims toward the torus with the bait, line tension will be momentarily reduced due to slack line, the torus will slide down the fishing pole taking up the slack line, and the motion and change of position of the torus obviously indicates a bite.

It is the object of the present invention to provide a method in which a simple device signals when a fish takes bait.

A further object is to provide for the signal to be visible in low ambient light conditions.

Another object is to provide a method for indicating a bite that does not scare fish when the signal is activated.

Still another object is to provide a method for indicating a bite that signals for fish moving the bait toward the fishing pole as well as moving away with the bait.

Yet a further object is to provide a method for indicating a fish biting that records that the bait has been moved.

Also an object is to provide a method for still fishing at night that varies a normal procedure as little as possible but provides a visible indicator.

DESCRIPTION OF THE PREFERRED EMBODIMENT

Figure 1:
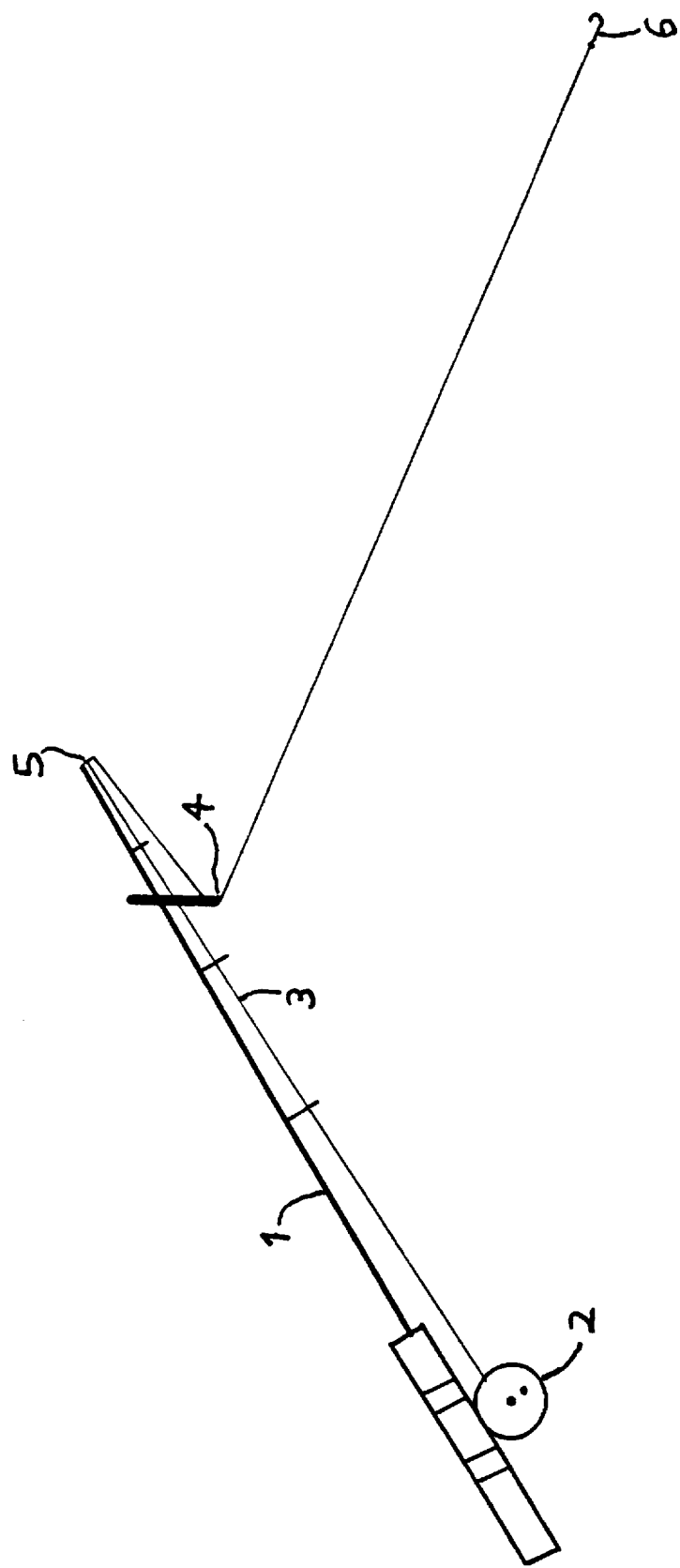
FIG. 1 is a pictorial view of a fishing pole, in place, set for a fish to bite. Said fishing pole would be supported to maintain an angle to the horizontal.
Figure 2:
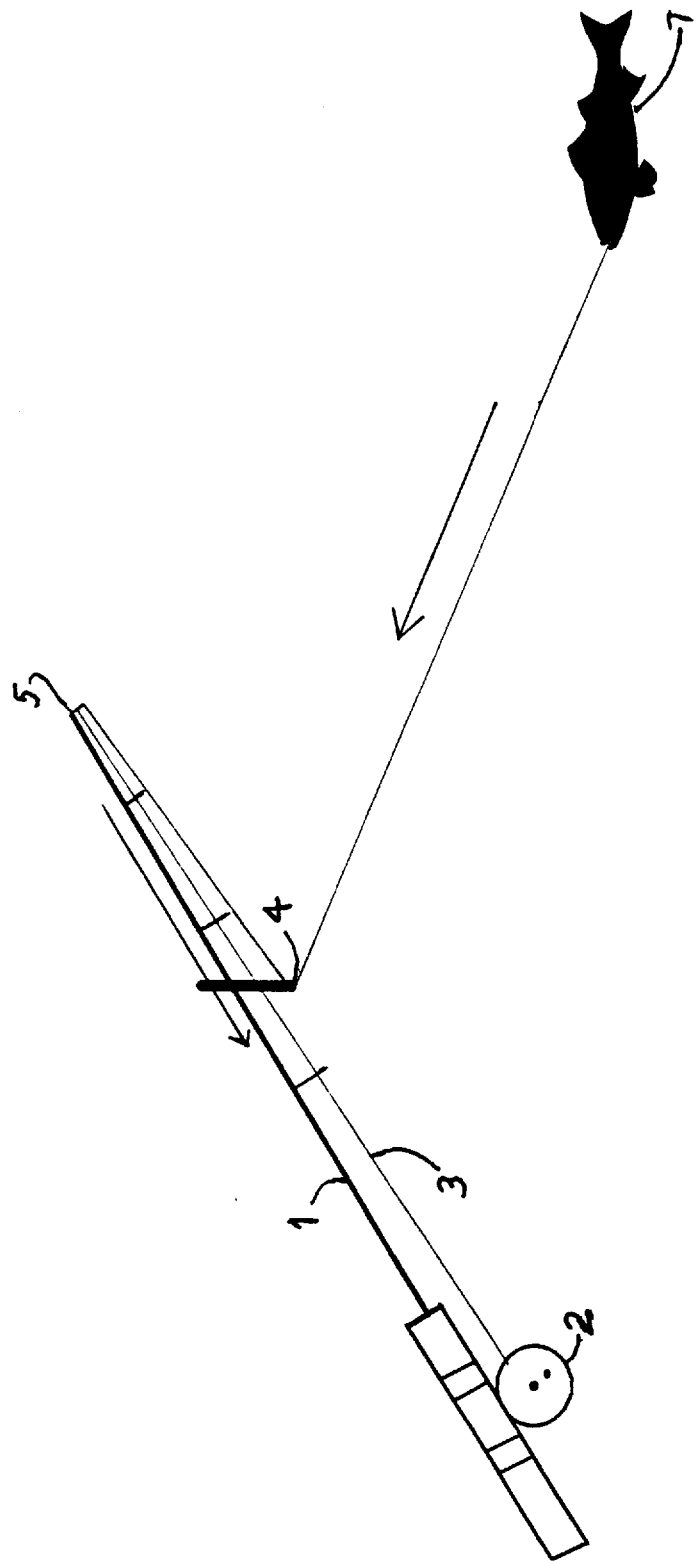
FIG. 2 is a view of a fishing pole with the torus after the fish has bitten the bait and moved said bait closer to said fishing pole, which lessened the tension on the line allowing the torus to slide down the pole in the direction of the reel.
Figure 3:
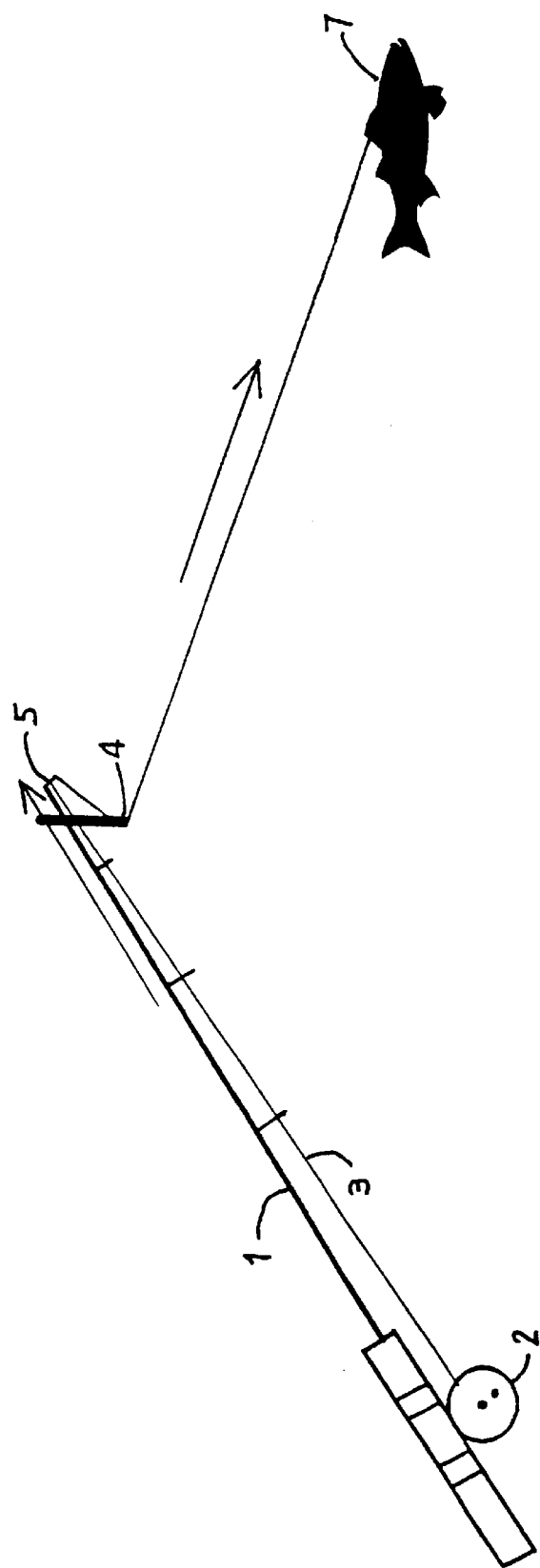
FIG. 3 is a view of a fishing pole with the present invention after a fish has bitten the bait and moved said bait away from said fishing pole which in turn increased line tension and moved the torus toward the tip of said fishing pole.

In particular, the method of the present invention can be described in detail with reference to the drawings. The steps are 1. Acquiring fishing tackle comprising at least a fishing pole 1 having a tip 5, reel 2, line 3, hook 6, bait (not shown), and a novel indicator torus 4;
2. Locating and moving said tackle to a stream bank or shore from which to fish (not depicted);
3. Baiting said hook 6 and casting the baited hook and line 3 in a normal fashion using said fishing pole 1;
4. Placing said pole 1 in a convenient support to hold the rod at an angle to the horizontal with the reel 2 locked after removing most of the slack in the line 3;
5. Placing said indicator torus 4 over the tip 5 of the pole such that the torus 4 is supported by the tension in the line.
6. Waiting for the torus 4 to change position indicating that a fish 7 has taken the bait and moved the hook 6.
7. Picking up the pole so as to shed the torus 4 onto the ground, hooking the fish and reeling it in as is conventionally done.

The preferred embodiment of the present invention would also include the use of a torus 4 made luminous so as to be seen a good distance away at night or in low ambient light conditions.

Said torus 4 can be described as being a geometric solid generated by rotating a circular area about a nonintersecting axis with a major diameter of gyration between 2 inches and 5 inches and a diameter of said circular area of ¼ inches to ¾ inches. For fishing in quiet conditions using a 10 pound monofilament line, the preferred weight for said torus is about 10 grams, but the person fishing should select a torus weight compatible with the line weight and fishing conditions.

Figure 5:
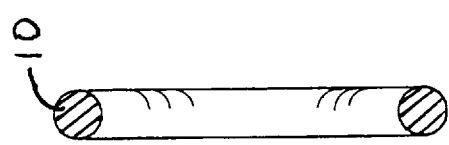
FIG. 5 shows a cut view of a solid torus.
Figure 4:
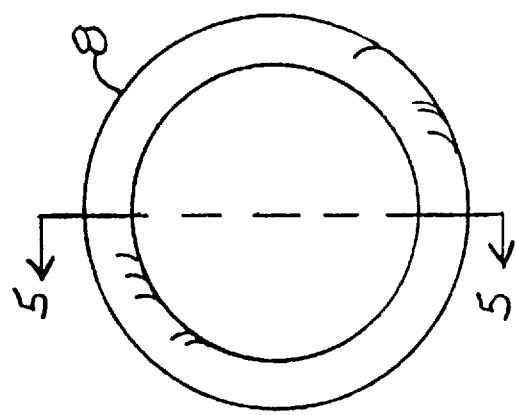
FIG. 4 shows a face of view a torus.

Said torus is shown in front view FIG. 4 and in a cut view FIG. 5 and may be made of any convenient material that provides a relatively hard slippery surface 8. A polyethylene plastic is a preferred material particularly in that it can be molded with a fluorescing filler 10 to provide excellent luminescence for night fishing. Also, metal fillers can be added at different concentrations to yield a range of weights for a variety of fishing conditions.

Figure 6:
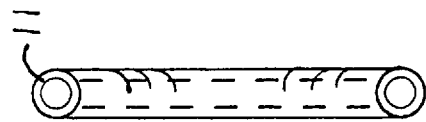
FIG. 6 shows a cut view of a hollow torus.

An alternate design, as in FIG. 6, uses a hollow torus preferably made from polyethylene tubing. Again the plastic wall material can molded including a fluorescing filler, or the hollow interior described by wall 11 may contain a fluorescing material.

Although the torus shape is preferred because it has been found to roll slightly when sliding up and down the pole thus riding over uneven spots at the ties for the pole eyes, other shapes including tubular sleeves, funnel shapes, and flat washer shapes do work on some poles and are intended to be included in the teachings of this disclosure. It is also obvious that the hollow torus might be made to contain a powered illumination device whose weight is within a desirable range. A small "wheat light" bulb powered through 30 awg wire connected to batteries on the ground has been demonstrated as a possible design for illumination but is not as simple as the use of a fluorescing material.

I claim:

1. A use of a torus having no means for pole attachment in a method of fishing comprising:

using a fishing rod and tackle of known art comprising at least a rod, reel, line and hook;

casting said line and said hook into waters believed to contain fish;

placing said rod in a braced position with said rod at an angle relative to the horizontal; and then placing said torus onto said rod in a manner such that said torus is positioned by tension and slack in said line whereby a change in tension produces a change in position of said torus which obviously indicates a bite.

2. The use of a torus having no means for pole attachment in a method of fishing as in claim 1 further comprising:

acquiring a luminescent torus molded of polyethylene plastic made luminescent by means of a fluorescing filler, and using said luminescent torus to be seen a good distance away while fishing at night or in low ambient light conditions.

3. The use of a torus having no means for pole attachment in a method of fishing as in claim 1 further comprising:

acquiring a torus that is a geometric solid generated by rotating a circular area about a nonintersecting axis with a major diameter of gyration between 2 inches and 5 inches and a diameter of said circular area of ¼ inches to ¾ inches and a weight of about 10 grams, and when placing said torus onto said rod, sliding the torus to a starting position such that said torus may slide down the fishing pole and be pulled up toward the tip of the fishing pole by increased tension in said line.

4. In a method of fishing that comprises the steps of:

acquiring fishing tackle comprising at least a fishing pole having a tip, reel, line, hook, and bait;

locating and moving said tackle to a stream bank or shore from which to fish;

baiting said hook and casting the baited hook and line in a normal fashion using said fishing pole thereby creating a cast line;

placing said fishing pole in a convenient support to hold the pole at an angle to the horizontal with the reel locked after removing most of the slack in said cast line;

waiting and watching for an indication that a fish has taken the bait and moved the hook; and picking up the pole to hook the fish and reel it in; an improvement that comprises the additional steps of:

acquiring a torus means of advantageous size separate from any part of said fishing pole and to be included in said fishing tackle; and after the step of baiting casting and before the step of waiting and watching for an indication that a fish has taken the bait, placing said torus means over the tip of said fishing pole, freely or unattached to said fishing pole, such that said torus means is positioned by tension in the cast line and any change in said tension will cause a change in the position of said torus means which creates a visual indication that a fish has taken the bait and moved the hook.

\* \* \* \* \*